United States Patent [19]

Böhm et al.

[11] 4,172,808
[45] Oct. 30, 1979

[54] PROCESS FOR THE PRODUCTION OF A TUNGSTEN CARBIDE CATALYST BY CARBURIZATION OF TUNGSTEN OXIDES

[75] Inventors: Harald Böhm, Glashütten; Robert Fleischmann, Hösbach; Jochen Heffler, Grossauheim, all of Fed. Rep. of Germany

[73] Assignee: Licentia Patent-Verwaltungs-G.m.b.H., Fed. Rep. of Germany

[21] Appl. No.: 887,530

[22] Filed: Mar. 17, 1978

[30] Foreign Application Priority Data

Mar. 24, 1977 [DE] Fed. Rep. of Germany ....... 2713308

[51] Int. Cl.$^2$ .................. B01J 27/22; C01B 31/34
[52] U.S. Cl. ............................ 252/443; 252/425.3; 423/440
[58] Field of Search ............... 252/443, 425.3; 423/440, 439

[56] References Cited

U.S. PATENT DOCUMENTS

3,902,917  9/1975  Barasel et al. .................. 423/440

FOREIGN PATENT DOCUMENTS

1916340  8/1971  Fed. Rep. of Germany .......... 423/440
2553373  6/1976  Fed. Rep. of Germany .......... 423/440

OTHER PUBLICATIONS

*Micron* (1975) vol. 6, No. 3-4; pp. 147-152 (Pergamon Press) "Characterization of Ultra-High Surface Area Tungsten Carbide", A. E. Forwalt et al.

*Primary Examiner*—P. E. Konopka
*Attorney, Agent, or Firm*—McGlew and Tuttle

[57] ABSTRACT

A process for the production of a tungsten carbide catalyst by carburization of tungsten oxides, comprises, directing a mixture of carbon monoxide and carbon dioxide over tungsten oxide while heating it in a heated reactor at a heating rate and gas flow rate such that the reduction of the tungsten oxide occurs more slowly than the diffusion of the carbon into the tungsten and into tungsten carbide which is formed during the reaction with the diffusion being faster than the separation of carbon from the gaseous phase according to the rate of adjustment of the Boudouard equilibrium. The carbon monoxide is charged at a rate of 560 ltr/h and the carbon dioxide is charged at a rate of 40 ltr/h and, after a reactor containing the sample of tungstic acid is positioned in a closed reactor, the reactor is flushed with the gases for around ten minutes and then placed into a muffle furnace. The reactor is heated to a temperature of 670° C. in the furnace and the temperature is then reduced to a reaction temperature of 620° C. First, all of the water is eliminated, and then there is a reduction of the tungsten oxides and a diffusion of the carbon into tungsten or into tungsten carbide which is formed. The reduction of the tungsten oxides occurs more slowly than the diffusion of the carbon, but faster than the deposition of the carbon from the gaseous phase.

5 Claims, 2 Drawing Figures

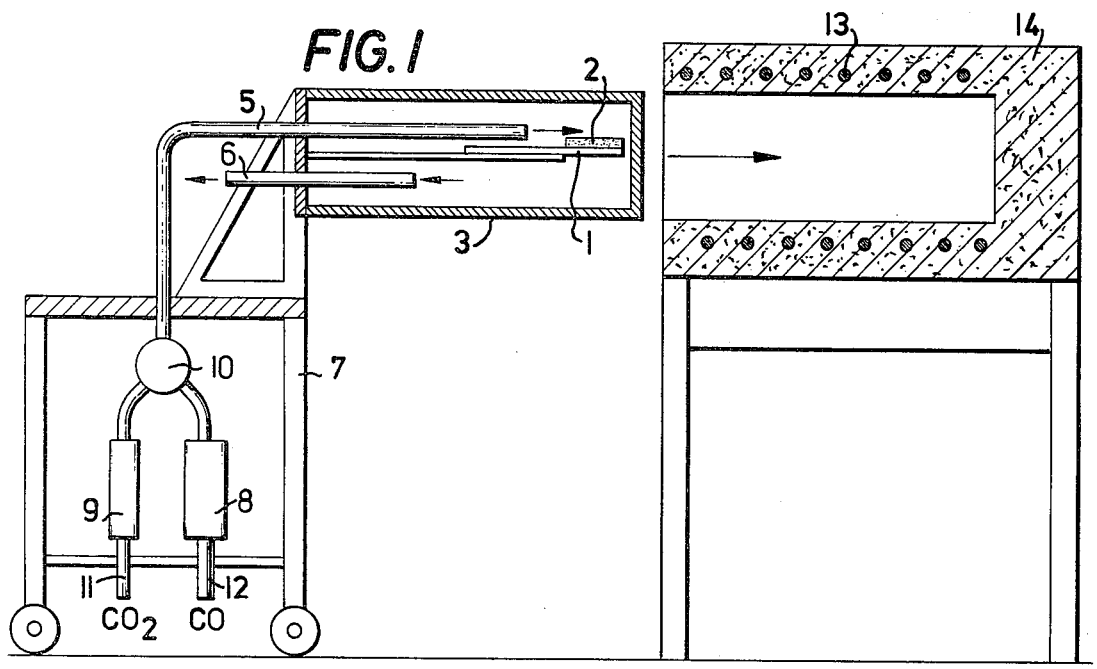
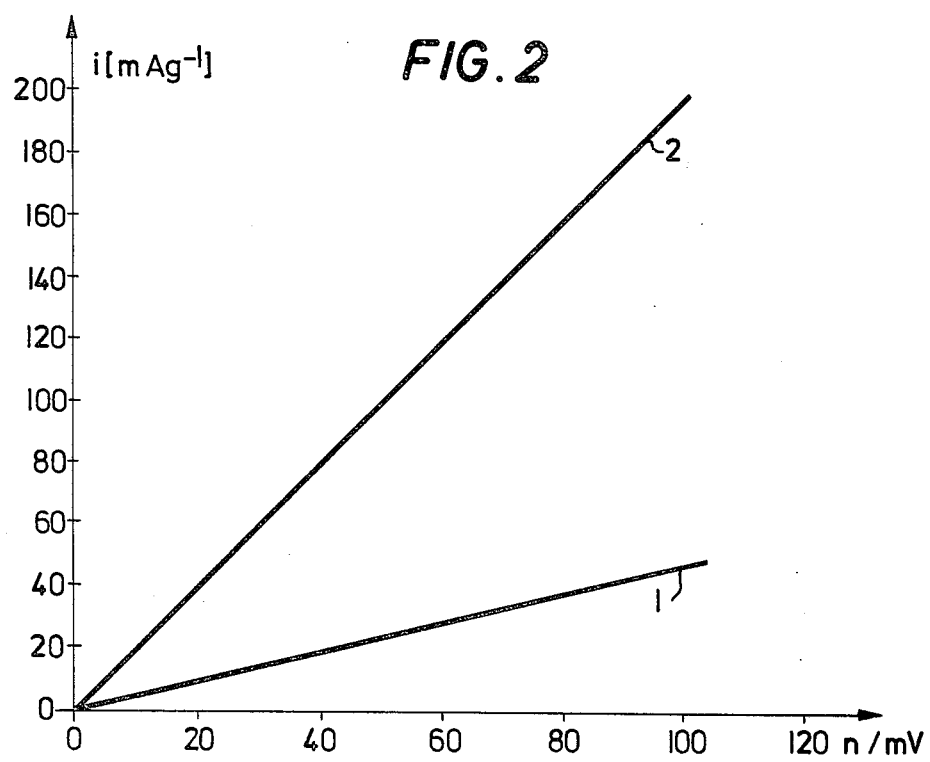

PROCESS FOR THE PRODUCTION OF A TUNGSTEN CARBIDE CATALYST BY CARBURIZATION OF TUNGSTEN OXIDES

FIELD AND BACKGROUND OF THE INVENTION

This invention relates particularly to a process for the production of a tungsten carbide catalyst by carburization of tungsten oxides, using a mixture of carbon monoxide and carbon dioxide which acts on a reaction material arranged in a heated reactor.

DESCRIPTION OF THE PRIOR ART

A process for the production of tungsten carbide as a catalyst for fuel cells is known from German Offenlegungsschrift No. 1,916,340 (patent disclosure) wherein tungsten powder or tungsten oxide is carburized at temperatures between about 600° C. and 1500° C. with carbon monoxide, or a mixture of carbon monoxide and 0.1 to 60% of carbon dioxide, in a rotary tube furnace for four to sixteen hours. A tungsten carbide electrode produced according to this process attains a current intensity of 50 mA.g$^{-1}$ at a polarization of 100 mV for the $H_2$-oxidation. With the known process, it has been found that, when producing tungsten carbide on a large scale, a material of very different activity from charge to charge is obtained.

SUMMARY OF THE INVENTION

The present invention makes it possible to produce a reproducible catalyst material and, in addition, to improve the activity thereof.

According to the invention, the reduction of tungsten oxides occurs more slowly than the diffusion of carbon into tungsten or tungsten carbide already formed, and this diffusion is faster than the separation of carbon from the gaseous phase, according to the rate of adjustment of the Boudouard equilibrium. With the process of the invention, an optimal production of the catalyst material with always equally high activity is achieved.

Accordingly, it is an object of the invention to provide a process for the production of a tungsten carbide catalyst by carburization of tungsten oxides at high temperatures which comprises, directing a mixture of carbon monoxide and carbon dioxide over tungsten oxide while heating it in a heated reactor at a heating rate and gas flow rate such that the reduction of the tungsten oxides occurs more slowly than the diffusion of the carbon into tungsten and into any tungsten carbide which is formed and that this diffusion is faster than the separation of carbon from the gaseous phase according to the rate of adjustment of the Boudouard equilibrium. Boudouard equilibrium is the temperature-dependent equilibrium between $CO_2$, C, and CO, see "Lehrbruch der Anorganischen Chemie" by Dr. Heinrich Remy 1965.

A further object of the invention is to provide a process for the production of a tungsten carbide catalyst which is simple in concept and easy to carry out.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the drawing:

FIG. 1 is a schematic representation of an apparatus for carrying out the process of the invention; and FIG. 2 is a curve indicating a comparison and a current intensity and polarization of the inventive material in respect to the prior art.

DESCRIPTION OF THE PREFERRED EMBODIMENT

Referring to the drawing in particular, the invention embodied therein is carried out by the use of the apparatus shown in FIG. 1. For the production of the tungsten carbide, 600 g light tungstic acid ($WO_3$ with 5 to 7% $H_2O$; grain size about 0.03 micron) are placed on a steel plate 1, shown in FIG. 1, as the layer 2. The dimensions of layer 2 are about 24×20×1 cm.

Steel plate 1 is inserted into a solid-bed reactor 3 having an opening of about 26×15 cm and a length of about 60 cm, being retained therein in a suitable manner. The opening of reactor 3 is hermetically closable by means of a plate 4 which has a gas inlet 5 of about 1 cm$^2$ and a gas outlet 6 of about 1 cm$^2$. Reactor 3 is carried by a wheelable frame 7. Frame 7 has installed therein two photoelectric flow meters 8 and 9 (gas regulators) which are known per se, for stabilizing the supply of carbon monoxide and of carbon dioxide, as well as a mixing chamber 10 connected with the gas inlet 5. The two gases are fed to the carbon dioxide inlet 11 and the carbon monoxide inlet 12 of the respective regulators 8 and 9.

Reactor 3, charged with the $WO_3$ (tungstic acid) layer 2 having been closed, the reaction gas mixture, exactly proportioned through the regulators 8 and 9 of carbon monoxide at a throughput of 560 ltr/h and carbon dioxide at a throughput of 40 ltr/h (total 600 ltr/h), is charged in the cold reactor 3, whereby, the oxygen present therein is displaced. After flushing for about ten minutes, the reactor 3, further charged with unchanged gas mixture and gas throughput, is introduced by means of a wheeled frame 7 into a muffle furnace 14 provided with a heating coil 13 and preheated to about 670° C., the preheating temperature being reduced to the reaction temperature of 620° C. immediately after the reactor 3 has been placed in the furnace 14.

At the named gas throughput and the named temperature, there occurs as a first reaction, the elimination of water, and then the reduction of tungsten oxides and the beginning of the diffusion of carbon into tungsten or into tungsten carbide which is already formed begins. The reduction of the material occurs more slowly than the diffusion of the carbon, but it occurs faster than the deposition of the carbon from the gaseous phase, according to the rate of adjustment of the Boudouard equilibrium which can form from the carbon monoxide.

Because of the high velocity, the gas charged into the reactor 3 will barely warm up in the reactor 3, will leave the reactor again almost immediately, and in so doing, it entrains in its path over the reaction material 2 the oxygen eliminated from the $WO_3$ before the oxygen can react with the tungsten carbide formed.

The deposition of carbon begins simultaneously with the reduction. The carbon atoms are embedded into lattice defects formed by the eliminated oxygen.

The conduction of the reaction is therefore such that the oxygen migrates slowly outward from the interior of the WO3 particles and is then brought very rapidly out of the reactor via the gas stream, whereby, carbon is also embedded more quickly into the particles.

By the rapid removal of the eliminated oxygen from the reactor 3 in connection with the named temperature, a surface oxidation of the particles and thus a decrease in activity is prevented.

After a reaction time of sixteen hours, the reactor 3 is removed from the furnace 14 while maintaining the gas throughput and is cooled from 620° C. to room temperature within one hour by means of fans (which have not been shown in detail). This rapid cooling decreases a separation of free carbon on the catalyst surface in the temperature range between 600° C. and 500° C., which would lead to a decrease in activity.

With the conduction of the reaction, an $O_2$ content of about 2% in the reaction material results, at which the activity is very good. Surprisingly, it has been found that precisely (by) the use of a solid-bed reactor rather than a rotary tube furnace or a fluidized bed process, a tungsten carbide of considerably improved activity is obtained at the stated gas throughput and temperature. Evidently, the oppositely directed reactions of reduction and solid diffusion must not be disturbed by swirling of the particles.

The gas throughput, reaction temperature, and reaction time may be in the following ranges:

Gas throughput, 200 to 800 ltr/h carbon monoxide and 20 to 40 ltr/h carbon dioxide at a reaction temperature between 590° C. and 680° C. and a reaction time of from ten to sixteen hours.

Four examples are given below.

| TEMPERATURE | REACTION TIME | CO | $CO_2$ |
|---|---|---|---|
| 680° C. | 14 h | 800 ltr | 40 ltr |
| 640° C. | 14 h | 580 ltr | 40 ltr |
| 620° C. | 16 h | 580 ltr | 40 ltr |
| 590° C. | 16 h | 200 ltr | 20 ltr |

From the characteristic curves of FIG. 2, the improvement of the catalytic activity of tungsten carbide attained by the process of the invention can be seen; on the ordinate is plotted the current intensity i in $mA.g^{-1}$ (g=gram of catalyst material) and on the abscissa, the polarization in mV. Curve 1 results with a tungsten carbide according to the publication named in the preamble, while curve 2 results with a tungsten carbide produced by the process of the invention. At a polarization of 100 mV, the known tungsten carbide has a current intensity i of about 50 $mA-g^{-1}$, while the tungsten carbide produced by the process of the invention has a current intensity i of about 200 $mA.g^{-1}$ at a polarization of 100 mV.

The tungsten carbide material obtained can also be used for other catalytic processes in addition to electrochemical $H_2$ oxidation.

While a specific embodiment of the invention has been shown and described in detail to illustrate the application of the principles of the invention, it will be understood that the invention may be embodied otherwise without departing from such principles.

What is claimed is:

1. A process for the production of a tungsten carbide catalyst by carburizing tungsten oxide at high temperatures while using a gas mixture of carbon monoxide and carbon dioxide acting on a reactant placed in a heated reactor comprising directing a mixture of carbon monoxide and carbon dioxide over the tungsten oxide while heating the tungsten oxide in a heated reactor maintained at a temperature in between from 590°–680° C. and for a reaction time of between 10 and 16 hours with a flow of carbon monoxide in the range of from 200 to 800 ltr/hr and with a flow of carbon dioxide of from 20-40 ltr/hr, and after the expiration of the reaction time cooling the reactant while the gas flow of the carbon monoxide and carbon dioxide is continued for about one hour to bring the reactants to the ambient temperature.

2. A process according to claim 1, wherein the tungsten oxide is first arranged in a layer of from about 24×20×1 cm and with a grain size of about from 0.03 microns and wherein the tungsten oxide is arranged in a solid bed reactor and is exposed to a temperature of about 620° C.

3. A process for the production of a tungsten carbide catalyst by carburization of a tungsten oxide, comprises, positioning tungsten oxide in a closed reactor, directing a gas flow of carbon dioxide and carbon monoxide into the reactor over the tungsten oxide and out of the reactor again, positioning the reactor in a heater and heating the reactor while the gas flow rate is maintained at around 560 ltr/h for the carbon monoxide and 40 ltr/h for the carbon dioxide, heating the reactor to a temperature of around 670° C. and then reducing it to a reaction temperature of around 620° C. and effecting the elimination of water, the reduction of the tungsten oxides and the diffusion of carbon into tungsten or into any tungsten carbide which is formed and wherein the reduction of the tungsten oxide occurs more slowly than the diffusion of the carbon but faster than the deposition of carbon from the gaseous phases.

4. A process, according to claim 3, wherein the gas which flows is at a rate so that it hardly warms up as it flows through said reactor and entrains the oxygen as carbon dioxide liberated from the tungsten oxide before it reacts with the tungsten carbide which is formed and, wherein, simultaneously with the reduction of the tungsten oxide, there is a deposit of carbon atoms embedded into lattice defects formed by the elimination of the oxygen.

5. A process, according to claim 4, wherein the reactor is removed from the heater after 16 hours and including cooling the reactor from 620° C. to room temperature rapidly.

* * * * *

UNITED STATES PATENT AND TRADEMARK OFFICE
CERTIFICATE OF CORRECTION

PATENT NO. : 4,172,808

DATED : October 30, 1979

INVENTOR(S) : Harald Böhm

It is certified that error appears in the above–identified patent and that said Letters Patent are hereby corrected as shown below:

On the cover page, Item [30], "Mar. 24, 1977" should read:
--- Mar. 25, 1977 ---.

Signed and Sealed this

Sixth Day of May 1980

[SEAL]

Attest:

SIDNEY A. DIAMOND

Attesting Officer

Commissioner of Patents and Trademarks